United States Patent [19]
Quaeck

[11] Patent Number: 5,156,259
[45] Date of Patent: Oct. 20, 1992

[54] SLAT-TYPE CONVEYER FOR UNIDIRECTIONAL LOAD MOVEMENT

[76] Inventor: Manfred W. Quaeck, 1515-210th Ave. NE., Redmond, Wash. 98053

[21] Appl. No.: 708,701

[22] Filed: May 31, 1991

[51] Int. Cl.⁵ .................................... B65G 25/00
[52] U.S. Cl. .................... 198/750; 198/772; 414/525.1
[58] Field of Search ............ 198/750, 772, 773, 774.1, 198/775; 414/525.1

[56] References Cited

U.S. PATENT DOCUMENTS

| | | | |
|---|---|---|---|
| Re. 33,196 | 4/1990 | Foster | 198/750 |
| 220,336 | 10/1879 | Brown | 198/775 X |
| 1,180,737 | 4/1916 | Rees | 198/772 X |
| 1,719,221 | 7/1929 | Gibney | 198/750 X |
| 3,048,258 | 8/1962 | Skold | 198/772 X |
| 3,534,875 | 10/1970 | Hallstrom, Jr. | |
| 4,143,760 | 3/1979 | Hallstrom, Jr. | 198/750 |
| 4,144,963 | 3/1979 | Hallstrom | 198/750 |
| 4,157,761 | 6/1979 | Debor | |
| 4,170,183 | 10/1979 | Cross | 198/773 X |
| 4,184,587 | 1/1980 | Hallstrom, Jr. | 198/750 |
| 4,492,303 | 1/1985 | Foster | 198/750 |
| 4,611,708 | 9/1986 | Foster | 198/750 |
| 4,679,686 | 7/1987 | Foster | 198/750 |
| 4,749,075 | 6/1988 | Foster | 198/750 |
| 4,785,929 | 11/1988 | Foster | 198/750 |
| 4,856,645 | 8/1989 | Hallstrom, Jr. | 198/750 |
| 4,962,848 | 10/1990 | Foster | 198/750 |

Primary Examiner—Joseph E. Valenza
Assistant Examiner—Tuan N. Nguyen
Attorney, Agent, or Firm—Graybeal Jackson Haley & Johnson

[57] ABSTRACT

A slat-type conveyer for unidirectional movement of a load is disclosed. A first drive interconnected with a bed causes bidirectional longitudinal movement of a first load bearing slat group in a first direction and a second direction. A second drive interconnected with the elongate bed causes longitudinal movement of a second load bearing slat group simultaneously with the movement of the first slat group in the first direction, and sequentially with respect to the movement of the first slat group in the second direction. A unidirectional load transporting surface on both the first slat group and the second slat group causes movement of the load when the first slat group and the second slat group move simultaneously in the first direction, but does not cause substantial movement of the load when the first slat group and the second slat group move sequentially in the second direction.

20 Claims, 4 Drawing Sheets

SLAT-TYPE CONVEYER FOR UNIDIRECTIONAL LOAD MOVEMENT

BACKGROUND OF THE INVENTION

The present invention pertains to a slat-type conveyer for unidirectional movement of a load. More particularly, the present invention pertains to a slat-type conveyer that moves loads of particulate matter such as gravel, hay, bark, soil, grass or granular chemicals or food products.

Conveyers having interleaved slats in general are disclosed in U.S. Pat. Nos. 3,534,875; 4,143,760; and 4,856,645 all issued to Hallstrom; and U.S. Pat. No. 4,611,708 issued to Foster. U.S. Pat. No. 3,534,875 discloses a slat conveyer having three groups of slats, two of which move simultaneously in a first load conveying direction while, at the same time, the third group moves in the opposite direction. In U.S. Pat. Nos. 4,143,760 and 4,611,708, three groups of slats all move simultaneously in a first load conveying direction and then each individual group moves sequentially in the opposite direction. U.S. Pat. No. 4,856,645 teaches a slat conveyer having a group of non-moving "dead" slats spaced between two groups of slats that move simultaneously in a load conveying first direction and sequentially in an opposite direction. The slat-conveyers of all the above patents move loads bi-directionally, as opposed to unidirectionally, and do not teach load bearing surfaces having a pattern that transports the load in desired direction.

U.S. Pat. No. 4,157,761 discloses a discharge mechanism for discharging particulate loads that includes first and second stoker rods each having a plurality of cross bars. A fixed floor angle is located between each of the cross bars. The first and second stoker rods reciprocate lengthwise, rapidly, and, at the same time but out of phase. The particulate load is thus agitated by the cross bars over successive fixed floor angles that prevent reverse load movement.

A need thus exists for a unidirectional slat-type conveyer, and specifically one that minimizes the number of drives required by employing only two moving slat groups for economical manufacture, that maximizes the load transporting surface by eliminating "dead" slats, and has a mode of operation that minimizes structured wear and maximizes reliability so as to provide a long trouble free useful life.

A need also exists for the above unidirectional slat type conveyer in which the slats do not rapidly reciprocate at the same time and out of phase, resulting in structural vibrating that damages components and accelerates machine wear.

A need also exists for a unidirectional slat type conveyer as above that does not require fixed floor angles that increase the cost of manufacture and that may damage the components by trapping the load against reciprocating cross bars.

SUMMARY OF THE INVENTION

The present invention is a slat-type conveyer for unidirectional movement of a load, and including a bed, a first load bearing slat group and a second load bearing slat group interleaved with the first slat group. A first drive and a second drive cause simultaneous longitudinal movement of the first and second slat groups in the first load bearing direction, and cause sequential movement of the first and second slat groups in the opposite direction. A unidirectional load transporting surface pattern on the slats of both groups transport the load in the first direction when all the slats are moved simultaneously in that direction. When the slats are sequentially moved in the reverse, or second direction, the unidirectional load transporting surface pattern slip under the load thus without causing substantial reverse load movement.

In the preferred embodiment of the present invention, the unidirectional load transporting surface pattern includes a plurality of unidirectional load transporting elements that are each substantially wedge-shaped. The unidirectional load transporting elements each have an abrupt load engaging vertical face, substantially perpendicular to the plane of the bed, that catches and pushes the load in the first direction. The unidirectional load transporting elements also have an upper face adjacent the load-engaging vertical face that slopes downwardly. The slope of the upper face is such that engaging vertical face resistance against the load is substantially greater than the load resistance against the sloped upper face to cause load movement by the load engaging vertical face during slat movement in the first direction, and to prevent load movement by the sloped upper face during slat movement in the second direction.

According to another aspect of the preferred embodiment of the present invention, a beveled edge is provided between the load engaging vertical face and the sloped upper face, and the load transporting elements on the slats of the first slat group are laterally staggered with respect to the load transporting elements on the slat or slats of the second slat group.

In another aspect of the preferred embodiment of the present invention, the first slat group and second slat group are comprised of a high molecular weight polyethylene polymer.

In another embodiment of the present invention, elongate sleeves connect smooth surface slats and slat inserts having a unidirectional load transporting surface pattern.

BRIEF DESCRIPTION OF THE DRAWINGS

These and other features of the invention will be more fully appreciated when considered in light of the following specification and drawings in which.

DETAILED DESCRIPTION OF THE PREFERRED EMBODIMENT

The present invention is a slat-type conveyer for unidirectional movement of particulate loads, such as gravel, hay, bark, soil, grass or granular chemicals or food products, by a two step slat movement sequence where each of two slat groups, each comprised of one or more slats, has a load transporting surface pattern.

Referring to FIGS. 1-4, slat-type conveyer 2 includes longitudinal bed 4 fixedly attached to the existing floor 6 of, for example a truck, trailer, conveyer support structure, bin or hopper (not shown). Longitudinal bed 4 is preferably comprised of metal, plastic or other load bearing surface having a sufficient strength to support multiple slats 8 and have a co-efficient of friction low enough to allow longitudinal sliding movement of the slats 8.

Figure 2:
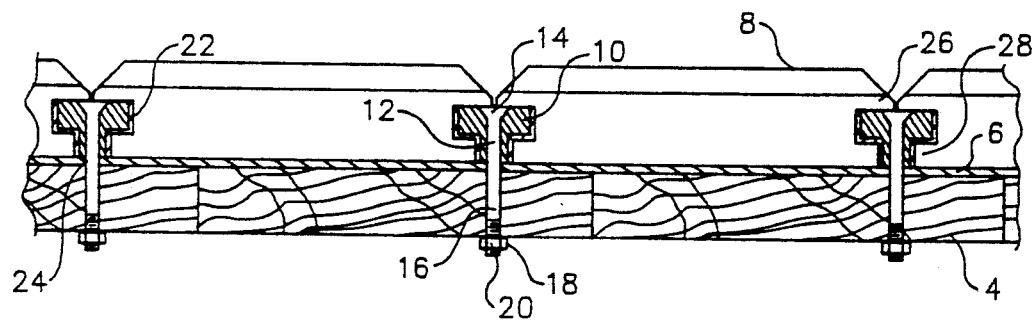
FIG. 2 is an end view of the slat-type conveyer of FIG. 1.

As shown in FIG. 2, slats 8 are slidably secured to support beams 10. Support beams 10 are preferably T-shaped in cross-section. Support beam attachment 12 includes a head 14, a longitudinal body 16, and a threaded end 18. A plurality of support beam attachments 12 are counter sunk through support beams 10, such that longitudinal body 16 of each support beam attachment 12 also passes through longitudinal bed 4 and floor 6, with threaded end 18 projecting therethrough. Nut 20 is removably attached to threaded end 18 to secure support beam attachment 12.

Slats 8 each preferably include a longitudinal groove 22 in each side 24. Preferably, longitudinal groove 22 is substantially of inverted L-shape in cross-section, with upper lip 26 and lower lip 28 defining longitudinal groove 22. As shown in FIG. 2, the inverted L-shaped cross-section of longitudinal groove 22 on two adjacent slats 8 form a T-shaped cross-section in which a support beam 10 resides to slidably secure the two adjacent slats 8.

Figure 5:
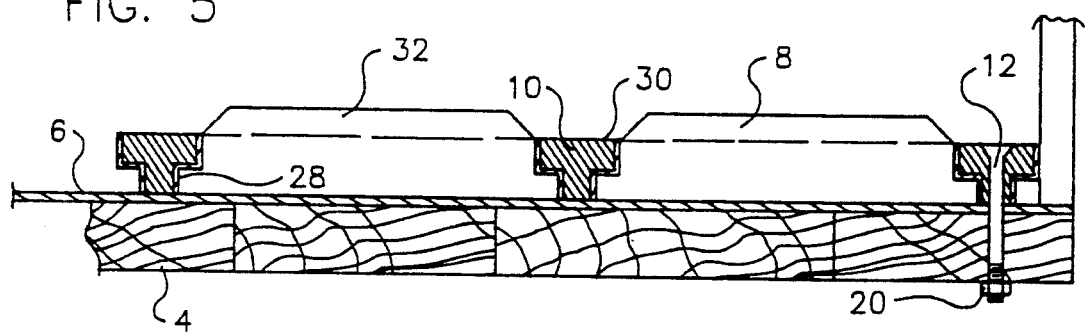
FIG. 5 is an end view of a fragmentary portion of another embodiment of the present invention showing an alternative slat securing configuration.

In an alternate embodiment, as shown in FIG. 5, longitudinal groove 22 lacks upper lip 26, thus exposing support beam 10 as part of the load bearing surface of slat-type conveyer 2. Note that in this alternate embodiment, the load bearing surface 30 of each support beam 10 is no more than about 17 percent of the load bearing surface 32 of each slat 8, and thus the contribution to frictional forces acting against load movement by the load bearing surface 30 of support beam 10 is negligible. The load bearing surface 30 of support beam 10 therefore does not affect the functioning of the present invention.

Referring again to FIGS. 1-4, slats 8 may be made of metal, wood, or plastic and are preferably comprised of a high or ultrahigh molecular weight polymer, such as, for example, polyethylene. Each slat 8 includes a plurality of unidirectional load transporting elements 34 preferably produced by embossing or molding processes known in the art.

Unidirectional load transporting elements 34 are preferably oriented in a single longitudinal row on each of slats 8, and are either staggered or in-line. However, more than one longitudinal row of load transporting elements may exist on each of slats 8. The unidirectional load transporting elements 34 on each of two adjacent slats 8 may either be oriented in lateral alignment with each other, as shown in FIG. 1, or may be oriented such that they are laterally staggered, as shown in FIG. 6.

Figure 1:
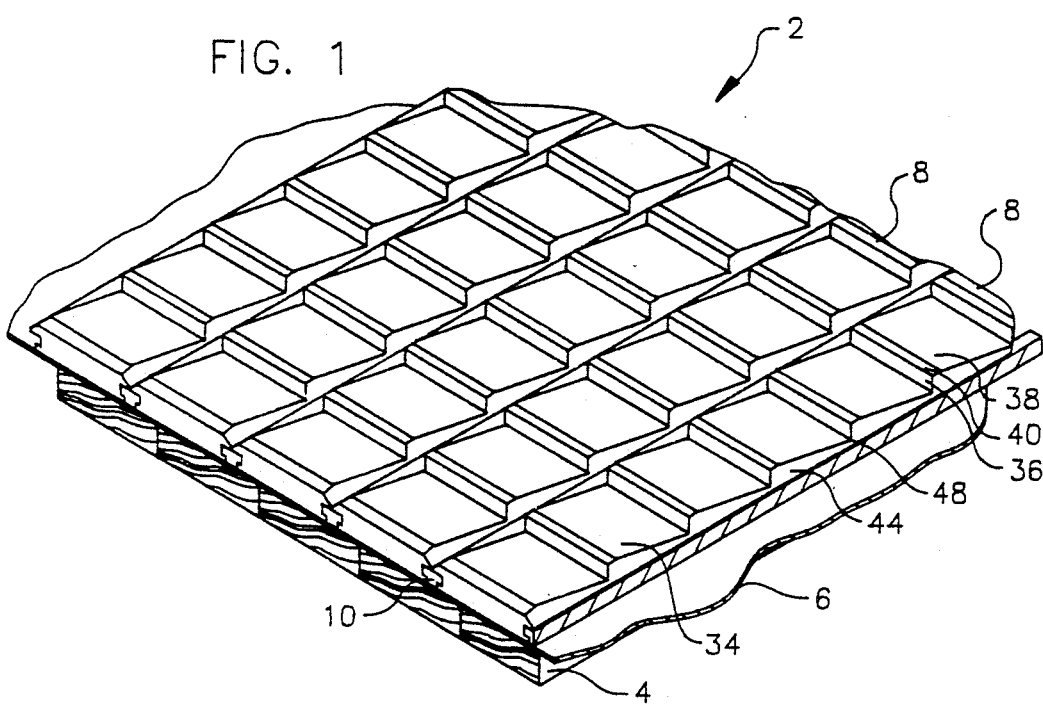
FIG. 1 is a perspective view of a fragmentary portion of a typical embodiment of the slat-type conveyer of the present invention.
Figure 3:
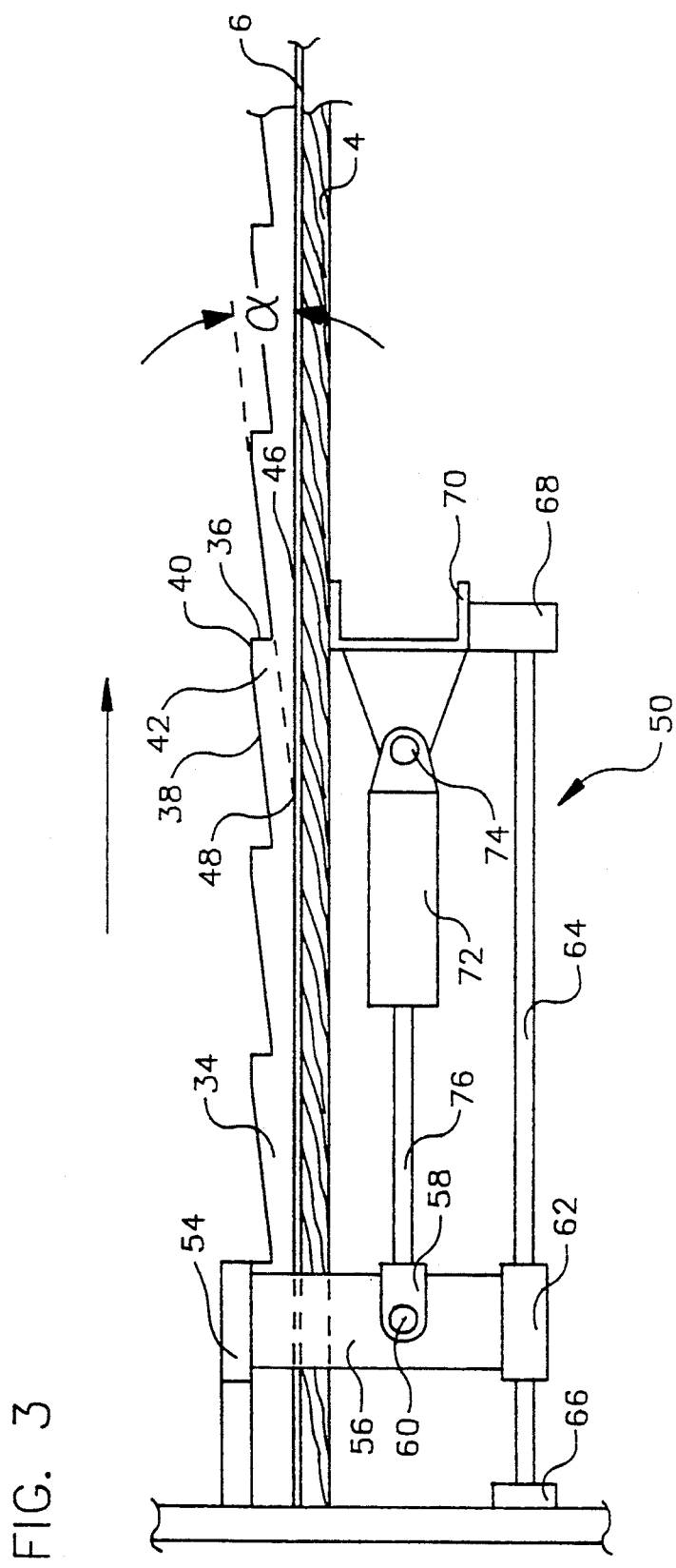
FIG. 3 is a side view of the slat-type conveyer of FIG. 1.
Figure 6:
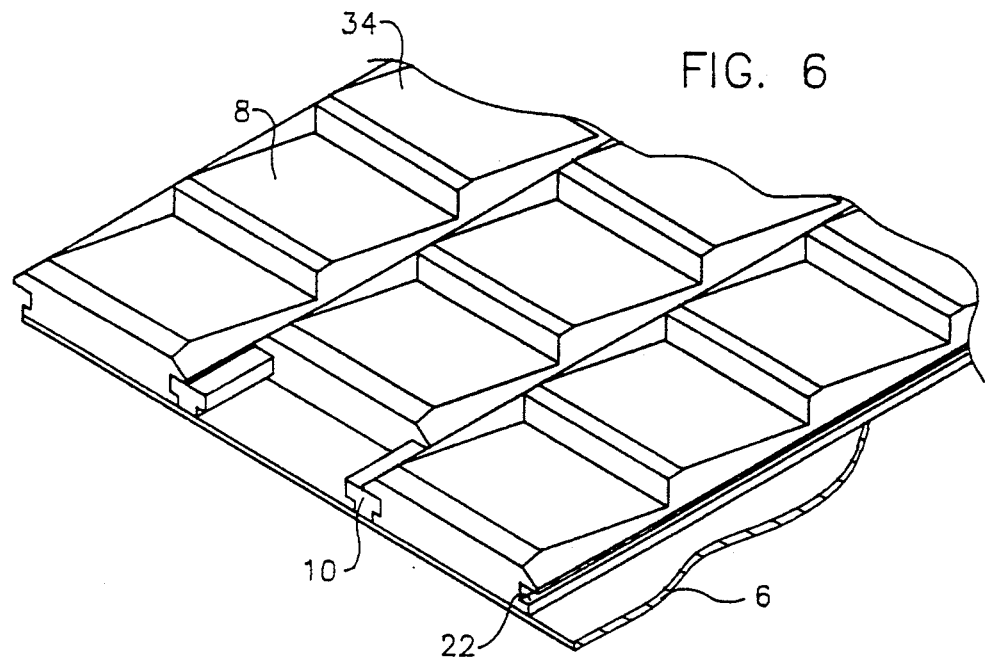
FIG. 6 is a perspective view of a fragmentary portion of yet another embodiment of the present invention in which the load transporting elements on adjacent slats are staggered laterally.

As shown in FIGS. 1, 3 and 6, each of unidirectional load transporting elements 34 preferably is substantially wedge shaped, but preferably having six faces instead of five. Specifically, each unidirectional load transporting element 34 includes load engaging face 36 perpendicular to bed 4, sloped upper face 38, beveled face 40 joining load engaging face 36 and sloped upper face 38, two sides 42 and 44, bottom face 46 that connects unidirectional load transporting element 34 to slat 8, and edge 48.

Beveled face 40 of each unidirectional load transporting element 34 is preferably disposed at an angle relative to the load on slat-type conveyer 2, such that beveled face 40 resists wear by the load from the reciprocating movements of slats 8. Edge 48 defines an edge angle alpha which is preferably an acute angle. More specifically, edge angle alpha is of an acute angle that results in the load resistance against load engaging face 36 (which is preferably substantially perpendicular to longitudinal bed 4) being substantially greater than the load resistance against sloped upper face 38. Edge angle alpha thus allows load engaging face 36 to move the load in a first direction when, as described below, the first slat and the second slat groups move simultaneously in a first direction, and also causes the load engaging face 36 to prevent backsliding of the load in a second opposite direction when the first slat group and the second slat group move sequentially in the second direction. Additionally, edge angle alpha is chosen such that sloped upper face 38 does not substantially move the load in the second direction when the first slat group and the second slat group move sequentially in the second direction, again discussed in further detail below. It is readily apparent that the actual angle of edge angle alpha will vary based upon the type of particulate load being conveyed, the number of unidirectional load transporting elements 34, the relative orientation of unidirectional load transporting elements 34 with respect to each other, and the material composition of unidirectional transporting elements 34. However, edge angle alpha is preferably an angle between about 10 degrees and about 15 degrees.

Figure 4:
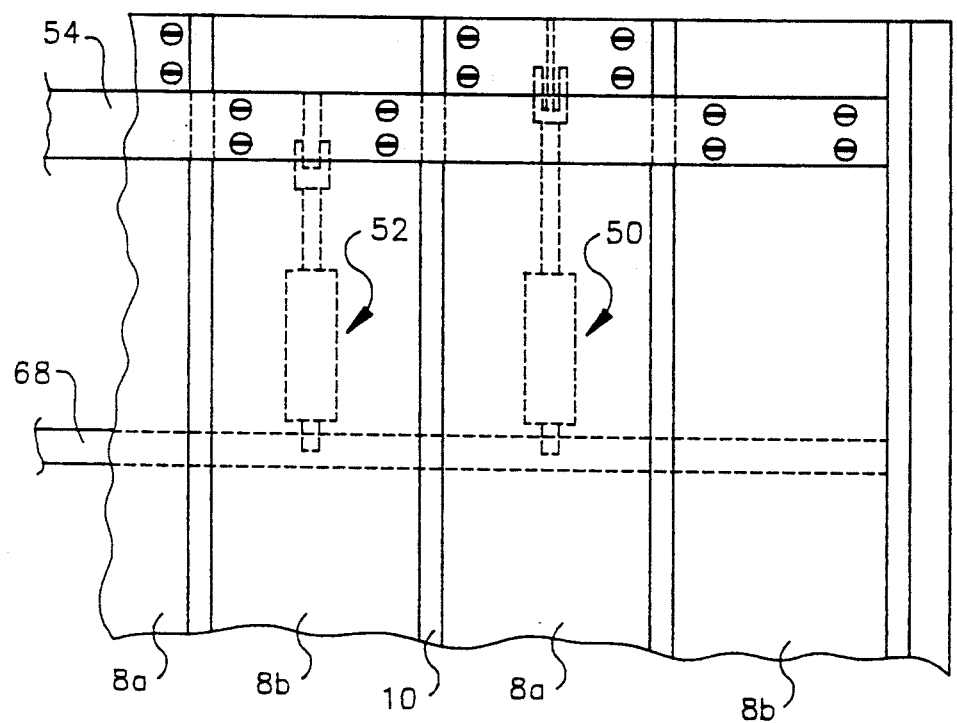
FIG. 4 is a top view of the slat-type conveyer of FIG. 1.

Referring specifically to FIGS. 3-4, the operation of the present invention is now described in detail.

The present invention is comprised of two groups of slats 8. One group is designated 8a and the other group is designated 8b. Each of groups 8a and 8b are comprised of one or more slats. The two slat groups, 8a and 8b, are oriented on longitudinal bed 4 such that slats of the group 8a and slats of the group 8b are alternated, with each of the elongated slats extending longitudinally on longitudinal bed 4 in the direction of conveying the movement. Referring specifically to FIG. 4, two slats of slat group 8a and two slats of slat group 8b are shown; it is to be understood, however, that each slat group can have fewer or more slat members as needed.

Each slat member of slat group 8a and 8b reciprocates longitudinally with respect to longitudinal bed 4 between a support beam 10 which separates each slat member.

The slat members of each of the two slat groups 8a and 8b are interconnected for simultaneous longitudinal reciprocation with all of the other slat members of its particular slat group, either 8a or 8b. In other words, the slat members of slat 8a are all connected with each other, but are not connected with the slat members of group 8b. Likewise, the slat members of group 8b are all connected with each other but not with the slat members of group 8a. Each of slat group 8a and slat group 8b are connected to a drive mechanism. Specifically, drive mechanism 50 powers slat group 8a and drive mechanism 52 powers slat group 8b. While the present invention contemplates two drive mechanisms, 50 and 52, only the elements of drive mechanism 50 will be explained. It is to be understood, however, that the components of drive mechanism 52 are identical to the below detailed elements of drive mechanism 50. It is also to be understood that drive mechanisms 50 and 52 operate independently of each other for independent operation of slat groups 8a and 8b.

Drive mechanism 50 includes lateral drive beam 54, which is fixedly attached to the slat members of slat group 8a. Drive beam support bracket 56 connects lateral drive beam 54 to support bearing 58 having pivot pin 60 and support sleeve 62. Support sleeve 62 is slidably mounted over stationary rod 64 which is fixedly attached to end wall 66 of longitudinal bed 4. The end of stationary rod 64 not attached to end wall 66 is fixedly mounted to lateral stationary beam 68 located under longitudinal bed 4. Connected between longitudinal bed 4 and stationary rod 64 by fixed bracket 70 is hydraulic cylinder 72. Pivot pin 74 provides the connection between hydraulic cylinder 72 and fixed bracket 70. In hydraulic cylinder 72 is a piston attached to drive rod 76. Drive rod 76 is in turn connected to support bearing 58. While hydraulic cylinder 72 is shown as the power source of the present invention when the pistons reciprocate in hydraulic cylinder 72 based upon the application of fluid pressure, it is readily apparent that other power sources such as electrical or gas powered ball-screw type linear actuators may be employed.

Drive mechanism 50 reciprocates the slat members of slat group 8a as follows. Application of fluid pressure selectively to opposite ends of hydraulic cylinder 72 causes movement of the piston within hydraulic cylinder 72 in either a first direction or an opposite second direction. This piston movement causes movement of drive rod 76 in the same direction as the piston, which in turn causes movement of support bearing 58, drive beam support bracket 56, lateral drive beam 54, and the slat members of slat group 8a. Additionally, movement of drive rod 76 causes movement in the same direction of support sleeve 62 attached to drive beam support bracket 56. The movement of support beam 62 is slidably along stationary rod 64. In this manner, the slat members of slat group 8a reciprocate in two directions longitudinally relative to longitudinal bed 4. Drive mechanism 52 reciprocates the slat members of slat group 8b in the same manner. It is thus apparent that drive mechanism 50 and drive mechanism 52 reciprocates slat group 8a and slat group 8b, respectively, bidirectionally and independently of each other.

To cause unidirectional conveyance of a particulate load, drive mechanism 50 and drive mechanism 52 both simultaneously cause longitudinal movement with respect to longitudinal bed 4 of slat group 8a and slat group 8b, respectively. This simultaneous movement of slat group 8a and slat group 8b in a first load moving direction, as shown by the arrow in FIG. 4, results in contact of the load by load engaging face 36 of each unidirectional load transporting element 34 on the slat members of both slat group 8a and slat group 8b. This contact between the load and the load transporting face 36 of the unidirectional load transporting elements 34 causes movement of the load in the direction of the arrow in FIG. 4. After this simultaneous movement of slat group 8a and slat group 8b in the first load moving direction, one of drive mechanism 50 and drive mechanism 52 is actuated for movement of either slat group 8a or slat group 8b in a second recovery direction opposite to the first load moving direction. After one of slat group 8a and slat group 8b has completed movement in the second recovery direction, the other of drive mechanism 50 and drive mechanism 52 is actuated for movement of the other of slat group 8a and slat group 8b in the second recovery direction. After both slat group 8a and slat group 8b have sequentially moved in the recovery direction, the above simultaneous movement of slat group 8a and slat group 8b in the first load moving direction is repeated. When slat group 8a and slat group 8b are sequentially moved in the second recovery direction, the substantially perpendicular orientation of load engaging face 36 of unidirectional load transporting elements 34 prevents back sliding of the particulate load towards the second recovery direction. Additionally, the acute edge angle alpha (preferably between about 10 degrees and about 15 degrees) provides a relatively low load resistance against sloped upper face 38 such that sloped upper face 38 can move under the particulate load without substantial movement of the particulate load in the second recovery direction. The acute angle of edge angle alpha also facilitates maximum load movement by load engaging face 36 in the first load moving direction.

Figure 7:
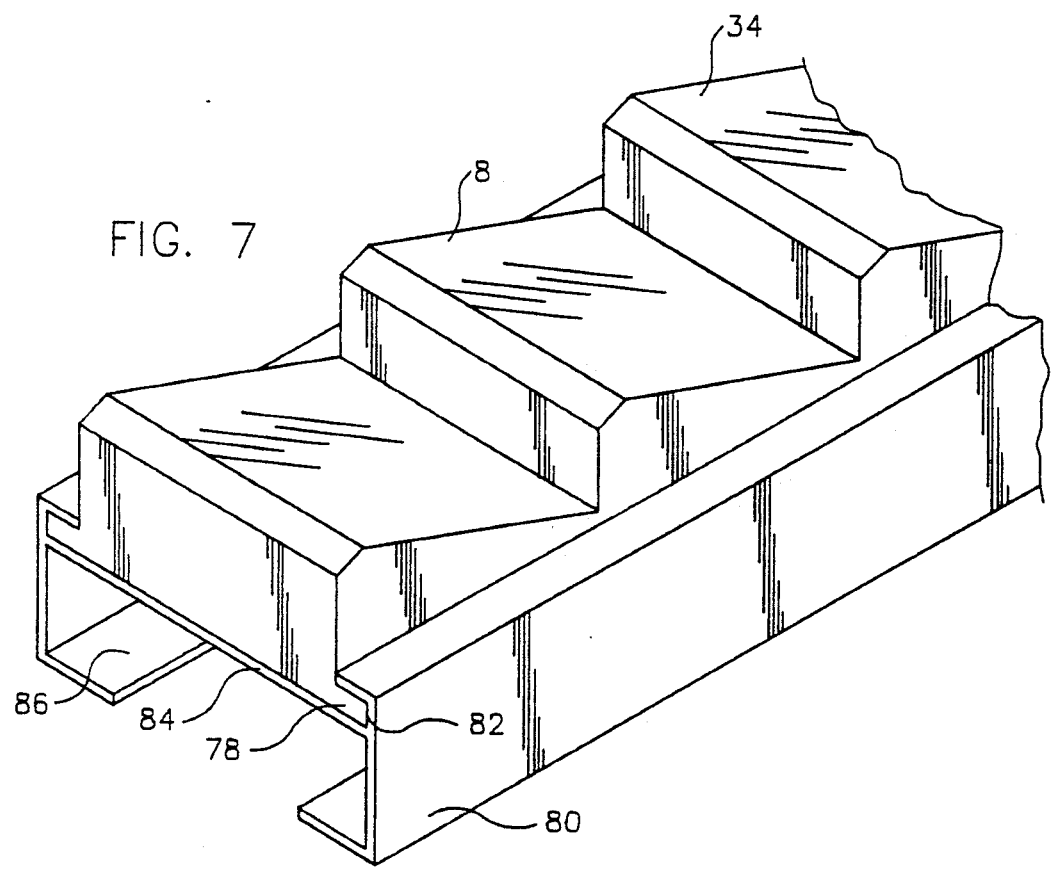
FIG. 7 is a perspective view of a fragmentary portion of still another embodiment of the present invention showing a longitudinal sleeve adapted to attach load transporting elements to a smooth surfaced slat.

In an alternate embodiment of the present invention, a plurality of pre-formed unidirectional load transporting elements 34 arranged longitudinally are attached to a slat 8 that, as manufactured, has a smooth load-bearing surface. Specifically referring to FIG. 7, unidirectional load transporting elements 34 include a pair of ribs 78 located on the sides of unidirectional load transporting elements 34 and extending outwardly. Ribs 78 are adapted to engage in elongate sleeve 80. Specifically, ribs 78 of unidirectional load transporting elements 34 mate within longitudinal channels 82 of elongate sleeve 80. Adjacent longitudinal channels 82 is partition 84 which extends longitudinally in elongate sleeve 80. Unidirectional load transporting elements 34 thus rest upon partition 84. Below partition 84, lips 86 are formed such that slat 8, having a smooth load-bearing surface, resides between partition 84 and lips 86. Elongate sleeve 80 is preferably formed by aluminum extrusion methods known in the art. As described above, it is readily apparent that slat-type conveyers having slats with smooth load-bearing surfaces can be modified with elongate sleeve 80 to accommodate unidirectional load transporting elements 34.

While particular embodiments of the present invention have been described in some detail here and above, changes and modifications may be made in the illustrated embodiments without departing from the spirit of the invention.

I claim:

1. A slat-type conveyer for unidirectional movement of a load comprising:
    a bed;
    no more than a pair of slat groups comprised of a first slat group on said bed adapted for bidirectional longitudinal sliding movement relative to said bed, said first slat group having a load bearing surface, and a second slat group interleaved with said first slat group on said bed, said second slat group adapted for bidirectional longitudinal sliding movement relative to said bed, said second slat group having a load bearing surface, said pair of slat groups lacking fixed slats;

a first drive means interconnecting said elongate bed and said first slat group, said first drive means causing bidirectional longitudinal sliding movement of said first slat group;

a second drive means interconnecting said elongate bed and said second slat group, said second drive means causing bidirectional longitudinal movement of said second slat group such that said first drive means and said second drive means cause simultaneous longitudinal sliding movement of said first slat group and said second slat group in a first direction, and said first drive means and said second drive means cause sequential longitudinal sliding movement of said first slat group and said second slat group in a second direction; and angled unidirectional load transporting means on said load bearing surface of said first slat group and on said load baring surface of said second slat group whereby said unidirectional load transporting means causes movement of the load on said first slat group and said second slat group when said first salt group and said second slat group move simultaneously in the first direction, and said unidirectional load transporting means does not cause substantial movement of the load when said first slat group and said second slat group move sequentially in the second direction.

2. The slat-type conveyer of claim 1 wherein each of said unidirectional load transporting means includes a plurality of unidirectional load transporting elements, and each of said unidirectional load transporting elements is substantially wedge-shaped and has:

a load engaging face substantially perpendicular to said bed; and a sloped face adjacent said load engaging face, whereby said wedge-shaped unidirectional load transporting element has an acute edge angle that results in load resistance against said load engaging face being substantially greater than load resistance against said sloped upper face so that said load engaging face moves the load in the first direction when said first slat group and said second slat group move simultaneously in the first direction, said load engaging face prevents backsliding of the load in the second direction when said first slat group and said second slat group move sequentially in the second direction, and said sloped upper face does not substantially move the load in the second direction when said first slat group and said second slat group move sequentially in the second direction.

3. The slat-type conveyer of claim 2 further comprising:

a beveled face between said load engaging face and said sloped upper face.

4. The slat-type conveyer of claim 1 wherein said unidirectional load transporting means on said first slat group and on said second slat group each comprise a longitudinal row of unidirectional load transporting elements and said unidirectional load transporting elements on said first slat group are in lateral alignment with said unidirectional load transporting elements on said second slat group.

5. The slat-type conveyer of claim 1 wherein said unidirectional load transporting means on said first slat group and on said second slat group are each comprised of a longitudinal row of unidirectional load transporting elements and said unidirectional load transporting elements on said first slat group are laterally staggered with said unidirectional load transporting elements on said second slat group.

6. The slat-type conveyer of claim 1 wherein said unidirectional load transporting means on said first slat group and on said second slat group each comprise a longitudinal row of unidirectional load transporting elements, said slat-type conveyer further comprising:

elongate sleeves adapted to secure said longitudinal row of unidirectional load transporting elements adjacent said load bearing surfaces of said first slat group and said second slat group.

7. The slat-type conveyer of claim 6 wherein said elongate sleeves each have a pair of longitudinal channels and said longitudinal rows of unidirectional load transporting elements each have a pair of longitudinal ribs adapted to engage said channels of said elongate sleeves.

8. The slat-type conveyer of claim 6 wherein said longitudinal rows of unidirectional load transporting elements are comprised of a high molecular weight polyethylene polymer.

9. The slat-type conveyer of claim 6 wherein said elongate sleeves are comprised of aluminum.

10. A unidirectional load transporting surface construction for the load bearing surfaces of no more than a pair of slat groups comprised of a first slat group and a second slat group that are adapted for simultaneous longitudinal sliding movement in a first direction and sequential longitudinal sliding movement in a second direction, said pair of slat groups lacking fixed slats, said unidirectional load transporting surface construction comprising:

angled unidirectional load transporting means for causing movement of the load on the first slat group and the second slat group of the pair of slat groups when the first slat group and the second slat group of the pair of slat groups move simultaneously in the first direction, and said unidirectional load transporting means not causing substantial movement of the load when the first slat group and the second slat group move sequentially in the second direction.

11. The unidirectional load transporting surface construction of claim 10 wherein each of said unidirectional load transporting means includes a plurality of unidirectional load transporting elements, and each of said unidirectional load transporting elements is substantially wedge shaped and has:

a load engaging face substantially perpendicular to the plane of the first slat group and the second slat group; and a sloped face adjacent said load engaging face, whereby said wedge-shaped unidirectional load transporting element has an acute edge angle the results in load resistance against said load engaging face being substantially greater than load resistance against said sloped upper face so that said load engaging face moves the load in the first direction when said first slat group and said second slat group move simultaneously in the first direction, said load engaging face prevents backsliding of the load in the second direction when the first slat group and the second slat group move sequentially in the second direction, and said sloped upper face does not substantially move the load in the second direction when the first slat group and the second slat group move sequentially in the second direction.

12. The unidirectional load transporting surface construction of claim 11 further comprising:
   a beveled face between said load engaging face and said sloped upper face.

13. The unidirectional load transporting surface construction of claim 10 wherein said unidirectional load transporting means on the first slat and on the second slat each comprise a longitudinal row of unidirectional load transporting elements and said unidirectional load transporting elements on the first slat are in lateral alignment with said unidirectional load transporting elements on the second slat.

14. The unidirectional load engaging surface construction of claim 10 wherein said unidirectional load transporting means on the first slat group and on the second slat group are each comprised of a longitudinal row of unidirectional load transporting elements and said unidirectional load transporting elements on the first slat group are laterally staggered with said unidirectional load transporting elements on the second slat group.

15. The unidirectional load transporting surface construction of claim 10 wherein said unidirectional load transporting means on the first slat group and the second slat group each comprise a longitudinal row of unidirectional load transporting elements, said surface construction further comprising:
   elongate sleeves adapted to secure said longitudinal row of unidirectional load transporting elements adjacent the load bearing surfaces of the first slat group and the second slat group.

16. The unidirectional load transporting surface construction of claim 15 wherein said elongate sleeves each have a pair of longitudinal channels and said longitudinal rows of unidirectional load transporting elements each have a pair of longitudinal ribs adapted to engage said channels of said elongate sleeves.

17. The unidirectional load engaging surface construction of claim 15 wherein said longitudinal rows of unidirectional load transporting elements are comprised of a high molecular weight polyethylene polymer.

18. The unidirectional load engaging surface construction of claim 15 wherein said elongate sleeves are comprised of aluminum.

19. A slat-type conveyer for unidirectional movement of a load comprising:
   a bed;
   no more than a pair of slat groups comprised of a first slat group on said bed adapted for bidirectional longitudinal sliding movement relative to said bed, said first slat group having a load bearing surface and a second slat group interleaved with said first slat group on said bed, said second slat group adapted for bidirectional longitudinal sliding movement relative to said bed, said second slat having a load bearing surface, said pair of slat groups lacking fixed slats;
   a first drive means interconnecting said bed and said first slat group, said first drive means causing bidirectional longitudinal sliding movement of said first slat group;
   a second drive means interconnecting said bed and said second slat group, said second drive means causing bidirectional longitudinal movement of said second slat group such that said first drive means and said second drive means cause simultaneous longitudinal sliding movement of said first slat group and said second slat group in a first direction, and said first drive means and said second drive means cause sequential longitudinal sliding movement of said first slat group and said second slat group in a second direction; and
   angled unidirectional load transporting means on said load bearing surface of said first slat group and on said load bearing surface of said second slat group whereby said unidirectional load transporting means causes movement of the load on said first slat group and said second slat group when said first slat group and said second slat group move simultaneously in the first direction, and said unidirectional load transporting means does not cause substantial movement of the load when said first slat group and said second slat group move sequentially in the second direction, each of said unidirectional load transporting means includes a plurality of unidirectional load transporting elements, and each of said unidirectional load transporting elements is substantially wedge shaped and comprises:
   a load engaging face substantially perpendicular to said bed;
   a sloped upper face adjacent said load engaging face, whereby said wedge-shaped unidirectional load transporting element has an acute edge angle that results in load resistance against said load engaging face being substantially greater than load resistance against said sloped upper face so that said load engaging face moves the load in the first direction when said first slat group and said second slat group move simultaneously in the first direction, said load engaging face prevents back sliding of the load in the second direction when said first slat group and said second slat group move sequentially in the second direction, and said sloped upper face does not substantially move the load in the second direction when said first slat group and said second slat group move sequentially in the second direction; and a beveled face between said load engaging face and said sloped upper face.

20. The slat-type conveyer of claim 19 wherein said unidirectional load transporting means on said first slat group and said second slat group each comprise a longitudinal row of unidirectional load transporting elements, said slat-type conveyer further comprising:
   elongate sleeves adapted to secure said longitudinal rows of unidirectional load transporting elements adjacent said load bearing surfaces of said first slat group and said second slat group.

* * * * *